(12) United States Patent
Burns

(10) Patent No.: US 7,605,391 B2
(45) Date of Patent: *Oct. 20, 2009

(54) OPTICALLY COUPLED RESONATOR

(76) Inventor: David W. Burns, 15770 Rica Vista Way, San Jose, CA (US) 95127-2731

( * ) Notice: Subject to any disclaimer, the term of this patent is extended or adjusted under 35 U.S.C. 154(b) by 490 days.

This patent is subject to a terminal disclaimer.

(21) Appl. No.: 11/164,915

(22) Filed: Dec. 10, 2005

(65) Prior Publication Data
US 2006/0196273 A1   Sep. 7, 2006

Related U.S. Application Data

(60) Provisional application No. 60/593,117, filed on Dec. 12, 2004.

(51) Int. Cl.
*H01L 27/14* (2006.01)
*H01L 31/00* (2006.01)
*H01L 29/82* (2006.01)

(52) U.S. Cl. .................... 257/21; 257/432; 257/444; 257/424; 257/415

(58) Field of Classification Search ............ 257/21, 257/291–294, 431–434, 444, 461–465, 415–424, 257/29.105
See application file for complete search history.

(56) References Cited

U.S. PATENT DOCUMENTS

| | | | |
|---|---|---|---|
| 4,126,049 A | 11/1978 | Cotter |
| 4,137,511 A | 1/1979 | Jones |
| 4,372,173 A | 2/1983 | EerNise |
| 4,567,451 A | 1/1986 | Greenwood |
| 4,721,925 A | 1/1988 | Farace |
| 4,724,351 A | 2/1988 | EerNisse |
| 4,743,752 A | 5/1988 | Olsen |
| 4,744,863 A | 5/1988 | Guckel |
| 4,772,786 A | 9/1988 | Langdon |
| 4,831,304 A | 5/1989 | Dorey |
| 4,841,775 A | 6/1989 | Ikeda |
| 4,853,669 A | 8/1989 | Guckel |
| 4,884,450 A | 12/1989 | Greenwood |
| 4,897,360 A | 1/1990 | Guckel |
| 4,926,143 A | 5/1990 | Harada |
| 4,966,649 A | 10/1990 | Harada |
| 4,996,082 A | 2/1991 | Guckel |
| 5,009,108 A | 4/1991 | Harada |
| 5,060,526 A | 10/1991 | Barth |
| 5,089,695 A | 2/1992 | Willson |
| 5,090,254 A | 2/1992 | Guckel |
| 5,101,664 A | 4/1992 | Hockaday |

(Continued)

OTHER PUBLICATIONS

U.S. Appl. No. 11/164,914, filed on Dec. 10, 2005 by David W. Burns (unpublished).

(Continued)

*Primary Examiner*—Cuong Q Nguyen
(74) *Attorney, Agent, or Firm*—David W. Burns

(57) ABSTRACT

An optically coupled resonator includes a resonator body having at least one resonator sidewall and a laterally offset photodiode formed in a semiconductor substrate adjacent to the resonator body. The resonator is driven by an electric field generated between the laterally offset photodiode and the resonator body when an incident light strikes the photodiode. A device including an optically coupled resonator and a method of operating an optically coupled resonator are also disclosed.

20 Claims, 16 Drawing Sheets

U.S. PATENT DOCUMENTS

| | | |
|---|---|---|
| 5,105,665 A | 4/1992 | Parsons |
| 5,165,289 A | 11/1992 | Tilmans |
| 5,188,983 A | 2/1993 | Guckel |
| 5,275,055 A | 1/1994 | Zook |
| 5,295,395 A | 3/1994 | Hocker |
| 5,338,929 A | 8/1994 | Douma |
| 5,417,115 A | 5/1995 | Burns |
| 5,442,963 A | 8/1995 | Largeau |
| 5,458,000 A | 10/1995 | Burns |
| 5,473,944 A | 12/1995 | Kurtz |
| 5,485,753 A | 1/1996 | Burns |
| 5,511,427 A | 4/1996 | Burns |
| 5,543,349 A | 8/1996 | Kurtz |
| 5,550,516 A | 8/1996 | Burns |
| 5,559,358 A | 9/1996 | Burns |
| 5,633,512 A * | 5/1997 | Okuda et al. ................ 257/192 |
| 5,654,819 A | 8/1997 | Goossen |
| 5,683,594 A | 11/1997 | Hocker |
| 5,714,690 A | 2/1998 | Burns |
| 5,729,075 A | 3/1998 | Strain |
| 5,747,705 A | 5/1998 | Herb |
| 5,772,322 A | 6/1998 | Burns |
| 5,780,742 A | 7/1998 | Burns |
| 5,808,210 A | 9/1998 | Herb |
| 5,831,262 A | 11/1998 | Greywall |
| 5,844,236 A | 12/1998 | Wilson |
| 5,880,509 A | 3/1999 | Watanabe |
| 5,969,257 A | 10/1999 | De Bortoli |
| 6,006,607 A | 12/1999 | Bryzek |
| 6,031,944 A | 2/2000 | Youngner |
| 6,229,190 B1 | 5/2001 | Bryzek |
| 6,246,638 B1 | 6/2001 | Zook |
| 6,255,728 B1 | 7/2001 | Nasiri |
| 6,346,742 B1 | 2/2002 | Bryzek |
| 6,351,996 B1 | 3/2002 | Nasiri |
| 6,487,913 B2 | 12/2002 | Debesis |
| 6,557,419 B1 | 5/2003 | Herb |
| 6,710,355 B2 | 3/2004 | Youngner |
| 6,714,007 B2 | 3/2004 | Youngner |
| 6,763,723 B1 | 7/2004 | Zook |
| 6,894,787 B2 | 5/2005 | Youngner |
| 6,966,228 B2 | 11/2005 | Binet |
| 7,176,048 B1 | 2/2007 | Burns |
| 7,379,629 B1 | 5/2008 | Burns |
| 2004/0231409 A1 | 11/2004 | Lelong-Feneyrou |
| 2004/0244502 A1 | 12/2004 | Youngner |
| 2007/0086502 A1 | 4/2007 | Burns |

OTHER PUBLICATIONS

U.S. Appl. No. 11/164,917, filed on Dec. 10, 2005 by David W. Burns (unpublished).

* cited by examiner

OPTICALLY COUPLED RESONATOR

CROSS-REFERENCES TO RELATED APPLICATIONS

This application claims the benefit of, and hereby incorporates by reference in its entirety U.S. Provisional Application No. 60/593,117 filed Dec. 12, 2004, and also incorporates by reference in its entirety co-pending U.S. Utility application Ser. No. 10/905,036 filed Dec. 12, 2004, U.S. Provisional Application No. 60/593,116 filed Dec. 12, 2004, U.S. Provisional Application No. 60/593,118 filed Dec. 12, 2004, and U.S. Provisional Application No. 60/593,119 filed Dec. 12, 2004.

FIELD OF THE INVENTION

This invention relates generally to semiconductor devices, and more specifically to optically coupled resonators for sensors, filters and oscillators.

BACKGROUND OF THE INVENTION

Resonant sensors are used in the precision pressure measurement field because of their high stability, high sensitivity and low temperature coefficients. Resonant sensors can be constructed of primarily silicon-based materials using standard processes of the semiconductor industry including thin-film deposition, etching, doping and lithography. While resonant pressure sensors are generally more complex than piezoresistive pressure sensors, their stability and accuracy are less dependent on electronic signal processing circuitry than are comparable piezoresistive sensors and capacitive sensors. Currently available resonant sensors have resonators comprised of a single material such as quartz, single crystal silicon or deposited polysilicon films. Very high precision resonators have been made from well-cut quartz.

The vibrating micromechanical body or resonator of a resonant pressure sensor provides a frequency as output data, the frequency depending upon a stress such as pressure that modifies the natural resonant vibrational frequency of the resonator. A load applied to the sensor structure strains the resonator causing a resonant frequency shift of the resonator. The frequency output of the resonator provides a measure of the magnitude of the mechanical load applied to the sensor structure, and as a result, pressure can be measured as a consequence of the frequency shift. Currently available resonant pressure sensors interface with analog and/or digital electronics to measure pressure.

In a conventional piezoresistive pressure sensor, deformations of a silicon diaphragm with applied pressure cause shifts in a Wheatstone bridge fabricated from single-crystal piezoresistors in the diaphragm resulting in a voltage output indicating the amount of pressure applied to the sensor. The output voltage from the Wheatstone bridge requires an analog-to-digital (AD) conversion to be used in digital systems. An example of a surface-micromachined absolute pressure sensor has a pressure diaphragm formed from a deposited thin film of polysilicon with an integral vacuum cavity reference directly under the diaphragm and dielectrically isolated polysilicon piezoresistors, as described in "Sealed cavity semiconductor pressure transducers and method of producing the same," U.S. Pat. No. 4,744,863, Guckel et al., issued May 17, 1988.

The widespread use and continuing trend toward digital information and control systems, together with the need for more accurate and higher-pressure instrumentation, have prompted the development of digital pressure transducers capable of precision measurements in pressure ranges up to about 250 MPa. One exemplary high-precision digital pressure sensor operates on the principle of changing the resonant frequency of load-sensitive quartz crystals with pressure-induced stress. Frequency signals from the quartz crystals are counted and linearized through microprocessor-based electronics to provide two-way communication and control in digital formats. The aforementioned quartz crystal pressure transducers have a resolution as good as a few parts per billion and have been used to determine the performance of high precision, primary standard dead-weight testers.

One example of a surface-micromachined resonant sensor has a resonant strain gage formed from a deposited thin film of polysilicon with an integral vacuum cavity surrounding the resonator. Several patents providing background to such resonant sensors include "Dielectrically isolated resonant microsensors," U.S. Pat. No. 5,417,115, Burns, issued May 23, 1995; "Static pressure compensation of resonant integrated microbeam sensors," U.S. Pat. No. 5,458,000, Burns et al., issued Oct. 17, 1995; "Cantilevered microbeam temperature sensor;" U.S. Pat. No. 5,511,427, Burns, issued Apr. 30, 1996; "Method for making a thin film resonant microbeam absolute;" U.S. Pat. No. 5,747,705 Herb et al., issued May 5, 1998; and "Thin film resonant microbeam absolute pressure sensor," U.S. Pat. No. 5,808,210 Herb et al., issued Sep. 15, 1998.

Another example of a resonant pressure sensor, which is fabricated from single-crystal silicon, is disclosed in "Semiconductor pressure sensor and its manufacturing method," Watanabe et al., U.S. Pat. No. 5,880,509 issued Mar. 9, 1999. The sensor comprises a single-crystal silicon substrate, a closed air-gap chamber, a measured diaphragm made by epitaxial growth, and a strain detection element incorporated in the measuring diaphragm.

The operation of a resonant pressure sensor requires a resonator to be excited into vibrational motion and detection of this motion. Forces and moments are applied that bend, twist, elongate or contract the resonator. Various methods for excitation and detection of resonant sensors have been proposed including thermal excitation with piezoresistive detection; electrostatic excitation with capacitive detection; Lorentz force excitation with magnetic flux detection; piezoelectric excitation with piezoelectric detection, and optical excitation with optical detection. In an exemplary method, resonant microbeams are driven and sensed by a single multimode optical fiber using a strain-sensitive oscillator, as described in "Fiber-optic vibration sensor based on frequency modulation of light-excited oscillators," U.S. Pat. No. 6,246,638, Zook et al., issued Jun. 12, 2001. A suggested method for driving and sensing a resonant sensor by using modulated and unmodulated light from multiple light sources is described in "Multi-wavelength optical drive/sense readout for resonant microstructures," U.S. Pat. No. 5,844,236, Wilson, issued Dec. 1, 1998. A photodetector detects the filtered reflected light to determine the resonant frequency of the resonator.

Resonators may be hermetically sealed in an evacuated cavity or enclosure to provide separation from the surrounding environment, eliminating effects such as air damping of the resonator and mass loading on the resonator body.

Micro-electrical-mechanical systems (MEMS) researchers are working on producing precision resonant pressure sensors having increased noise immunity, intrinsic safety, and long line-driving capability. It is desirable that a pressure sensor can operate in the harsh conditions associated with, for example, turbine engines, high-speed combustors, and other aerospace and industrial applications.

Because of limitations in the use of electrically powered/electrical output sensors in high-noise environments, hazardous areas, and some medical applications, it is advantageous to combine the precision of resonator-based sensors with the total optical isolation of fiber-optic technology. One method of optically powering a resonant low-pressure sensor is described in "Optically powered resonant integrated microstructure pressure sensor," Youngner, U.S. Pat. No. 6,710,355, issued Mar. 23, 2004.

In the pressure-sensor industry and other sensor application areas, the need exists for precise and stable sensors having low hysteresis, remote access, electromagnetic interference (EMI) immunity, and increased safety in harsh, volatile, or explosive environments with the elimination of voltage and electronic circuitry at the sensor element. Additional features that are desirable for resonant sensors include a simplified fabrication process, integral vacuum sealing, reduction or elimination of stiction and snap-down or pull-in problems associated with the resonator, accurate positioning of the drive and sense electrodes, alignment of the phase between the drive frequency and resonator movement over a wide frequency range, high signal-to-noise ratio of the detected signal, simplification of the optical interface to the resonator, and the opportunity for relatively easy integration of the sensor with more complex fabrication processes such as complementary metal-oxide-semiconductor (CMOS) and bipolar complementary metal-oxide-semiconductor (BiCMOS) processes.

SUMMARY OF THE INVENTION

One aspect of the invention is an optically coupled resonator having a resonator body with at least one resonator sidewall and a laterally offset photodiode formed in a semiconductor substrate adjacent to the resonator body. The resonator is driven by an electric field generated between the laterally offset photodiode and the resonator body when an incident light strikes the photodiode.

Another aspect of the invention is a device including an optically coupled resonator with a lateral offset photodiode that is adjacent to the resonator. The resonator is driven by a driving component of an electric field generated between the laterally offset photodiode and the resonator when an incident light strikes the photodiode.

Another aspect of the invention is a method of operating an optically coupled resonator. A laterally offset photodiode is struck with an incident light. An electric field is generated between the laterally offset photodiode and the resonator in response to the incident light. The resonator is driven with a driving component of the electric field that diminishes when the resonator is displaced.

Other aspects, features and attendant advantages of the present invention will become more apparent and readily appreciated by the detailed description given below in conjunction with the accompanying drawings. The drawings should not be taken to limit the invention to the specific embodiments, but are for explanation and understanding and are not necessarily drawn to scale. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE INVENTION

Figure 1:
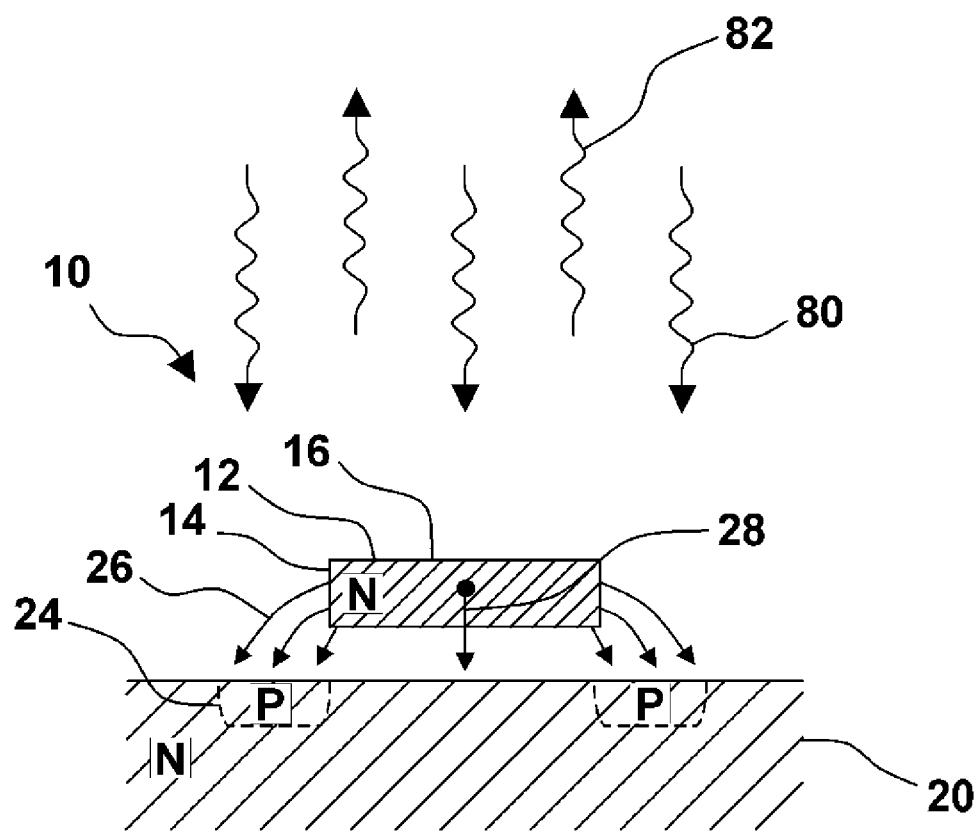
FIG. 1 is a cross-sectional view of an optically coupled resonator, in accordance with one embodiment of the current invention.

FIG. 1 is a cross-sectional view of an optically coupled resonator, in accordance with one embodiment of the present invention. Optically coupled resonator 10, having resonator body 12 and one or more resonator sidewalls 14, is adjacent to laterally offset photodiode 24 that may be formed in semiconductor substrate 20 such as an n-type or p-type single-crystal silicon wafer, a silicon-on-insulator (SOI) wafer, a handle wafer of a silicon-on-insulator wafer, a double-SOI wafer, or another suitable substrate. Photodiode 24 or a laterally offset electrode connected thereto is positioned laterally off of one or more sidewalls 14 of resonator body 12 and is typically in a different plane than resonator body 12. In this figure and elsewhere, photodiode 24 is shown with an ion implanted p-type anode in an n-type substrate using patterning and doping processes, although an n-type implanted region with a p-type substrate or other diode formation processes and structures may also suffice, as are known in the art.

A laterally offset photodiode refers herein to an optically sensitive semiconductor diode laterally disposed with respect to the resonator body and not located in the substrate directly underneath the resonator body. Generally, incident light for exciting the resonator does not traverse the resonator body or travel through the substrate to strike a laterally offset photodiode in the substrate, although the incident and reflected light may traverse the shell. A general characteristic of a laterally offset photodiode in the substrate is that only a portion or component of the photogenerated electric field between the photodiode and the resonator causes the resonator body to travel in a particular resonant mode. Alternatively, a photodiode for exciting the resonator may be positioned in a portion of the upper surface of the resonator, in a sidewall of the resonator, in a sidewall of the structural layer adjacent to the resonator body, or in the shell, and the resonator may be driven with all or a component of the generated electric field when incident light strikes the photodiode.

Electric field 26 generated between laterally offset photodiode 24 and resonator body 12 drives resonator 10 when incident light 80 strikes photodiode 24. In one example, a static deflection of resonator 10 occurs when incident light 80 of constant intensity strikes laterally offset photodiode 24. In another example, dynamic vibrations of resonator 10 occur when incident light 80 that is modulated at or near a resonant frequency of resonator 10 strikes laterally offset photodiode 24.

Resonator body 12 may have one of various geometries such as a rectangular geometry, a circular geometry, a ring geometry, an x-shaped geometry or other geometries including singly and doubly supported designs, layered resonators, tuning forks, balanced configurations, and other geometries. Resonator body 12 may be formed from, for example a material such as amorphous silicon, polycrystalline silicon, epi-poly, epitaxial silicon, single-crystal silicon, silicon-germanium, silicon carbide, diamond, or a combination thereof that is deposited or otherwise formed on semiconductor substrate 20 or on a sacrificial layer formed thereon. For example, patterning and etching techniques in combination with the use of selectively removed sacrificial layers may be used to form resonator 10 and to seal resonator body 12 with an optional resonator shell around resonator body 12. Resonator body 12 may be fixedly attached to semiconductor substrate 20 at one attachment location, such as at a supported end of a cantilevered beam or at the center of a ring or disk resonator. Alternatively, resonator body 12 may be fixedly attached to semiconductor substrate 20 at opposite ends of resonator body 12 as in a clamped-clamped beam such that mechanical strain applied to the opposite ends of resonator body 12 causes a shift in one or more resonant frequencies of resonator 10.

As resonator 10 is displaced from an equilibrium or resting position, restoring forces are generated that pull resonator 10 back towards the equilibrium position. Resonators operating in a minimal damping environment such as operating within a vacuum-sealed resonator shell can vibrate freely for many cycles after the driving forces are removed or can ring down after one or more pulses of incident light 80 are applied to photodiode 24.

Depending in part on the resonator geometry, laterally offset photodiode 24 may be adjacent to outer sidewall 14, inner sidewall 14, or a combination thereof. Generated electric field 26 between laterally offset photodiode 24 and resonator body 12 has driving component 28 in the direction of travel of resonator 10. In one example, driving component 28 of electric field 26 is perpendicular to and in the direction of semiconductor substrate 20 for resonator 10 operating in a fundamental resonant mode whereby resonator body 12 moves periodically towards and away from semiconductor substrate 20. In another example, driving component 28 is in a plane parallel to an upper surface of semiconductor substrate 20 when a resonant mode of resonator 10 lies in the parallel plane. Allowable resonant modes and associated resonant frequencies are determined in part by the geometry and thickness of resonator 10, the attachment configuration of resonator body 12 to semiconductor substrate 20, the position and size of one or more laterally offset photodiodes 24, and the modulation of incident light 80.

One aspect of laterally offset photodiode 24 is that driving component 28 of generated electric field 26 can diminish when resonator body 12 is displaced towards semiconductor substrate 20. A desirable attribute is that generated electric field 26 between laterally offset photodiode 24 and resonator body 12 diminishes when resonator body 12 is displaced to prevent electrostatic pull-in, an unstable position whereby a portion of resonator body 12 is electrostatically attracted to and may become stuck against semiconductor substrate 20. Electrostatic pull-in, also referred to as snap-down or snap-in, may be avoided with sufficient lateral space between sidewall 14 of resonator 10 and laterally offset photodiode 24. Another desirable attribute is that laterally offset photodiode 24 can generate driving component 28 of electric field 26 substantially in phase with a vibrating velocity of resonator body 12 with appropriate modulation of incident light 80. For example, modulated incident light 80 in phase with a vibration velocity of resonator 10 provides a large driving component 28 as resonator body 12 moves through its static equilibrium point while traversing towards semiconductor substrate 20. As resonator body 12 reaches its maximum downward displacement, driving component 28 is diminished. The intensity of incident light 80 may also be reduced as resonator body 12 reaches its maximum downward displacement to reduce the level of driving component 28. As resonator body 12 reverses direction and reaches its maximum upward displacement, driving component 28 is again diminished due to a reduction of the driving force with the square of the distance, and may be further reduced with a controlled reduction in the intensity of incident light 80. As resonator body 12 again reverses direction, increases in the intensity of incident light 80 and natural movement of resonator body 12 towards the equilibrium or resting position again propels resonator body 12 past the resting position, and then the resonant frequency cycle continues. Excitation of resonator 10 into one or more resonant frequencies may be obtained by modulating incident light 80 with, for example, a sine wave, a half-sine wave, a square wave, or a series of short pulses at the resonant frequency of resonator 10 or a multiple or submultiple thereof.

To detect one or more resonant frequencies of resonator 10, vibrations of resonator 10 may be sensed with reflected light 82 reflected from one or more resonator surfaces 16 of resonator 10. In one example, a portion of incident light 80 reflected from resonator surface 16 is intensity modulated with displacements and curvature of resonator body 12, and reflected light 82 is detected with an external photodetector to determine one or more resonant frequencies of resonator 10. In another example, a first light source at a first wavelength is modulated to provide modulated incident light 80. A second light source at a second wavelength different than the first provides unmodulated incident light 80 that is modulated as resonator body 12 is displaced. In another example, a light source is pulse-modulated to excite resonator 10, then reduced to a constant intensity to allow detection of resonator vibrations without pulling the resonant frequency and to increase the signal-to-noise ratio of the detected light. In another example, a light source is modulated at a low duty cycle at a multiple or submultiple of one or more resonant frequencies of resonator 10, and a second light source at a nominally constant incident intensity is used to detect resonator movements. The resonator may be excited by scanning through one or more resonant frequencies, subharmonics or multiples thereof with one of a variety of modulation waveforms.

Photodiode 24, illustrate here as formed in semiconductor substrate 20, may alternatively be positioned underneath, to the side, or above resonator body 12. In another embodiment, photodiode 24 is positioned further away from resonator body 12 and electrically connected to a laterally offset electrode that is adjacent to resonator body 12. In another embodiment, a plurality of photodiodes 24 is positioned adjacent to selected portions of resonator body 12 to allow preferential excitation of higher order resonant modes. In another embodiment, photovoltage or photocurrent generated by photodiode 24 with vibrations of resonator body 12 provide input signals for on-board or off-chip electronic circuitry.

Figure 9:
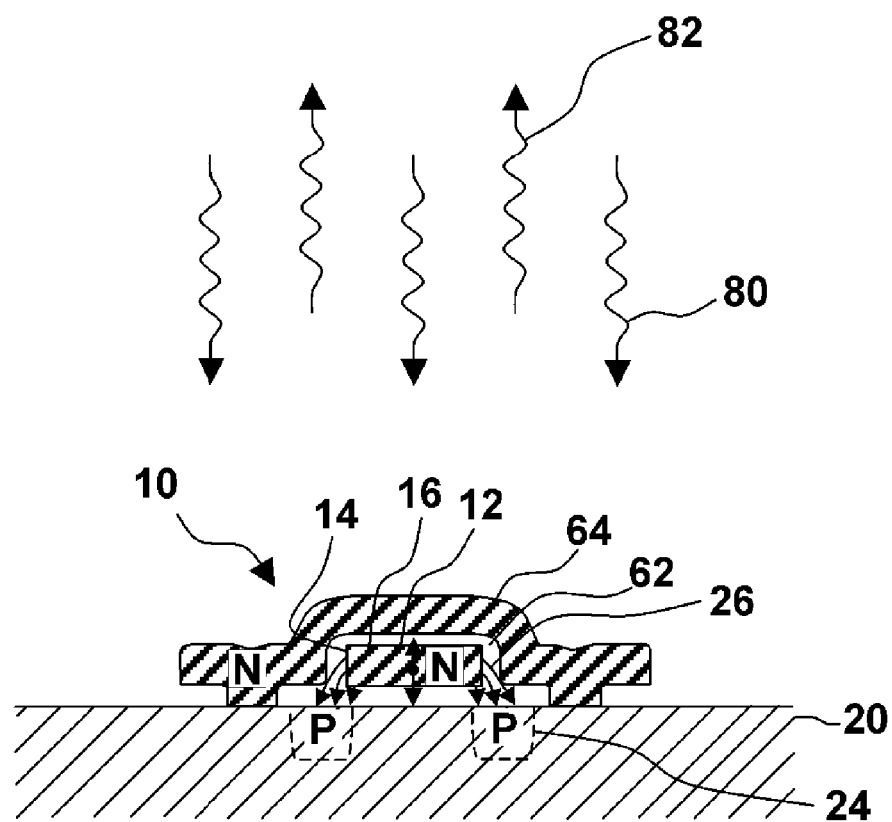
FIG. 9 is a cross-sectional view of an optically coupled resonator with a resonator shell, in accordance with one embodiment of the current invention.
Figure 10:
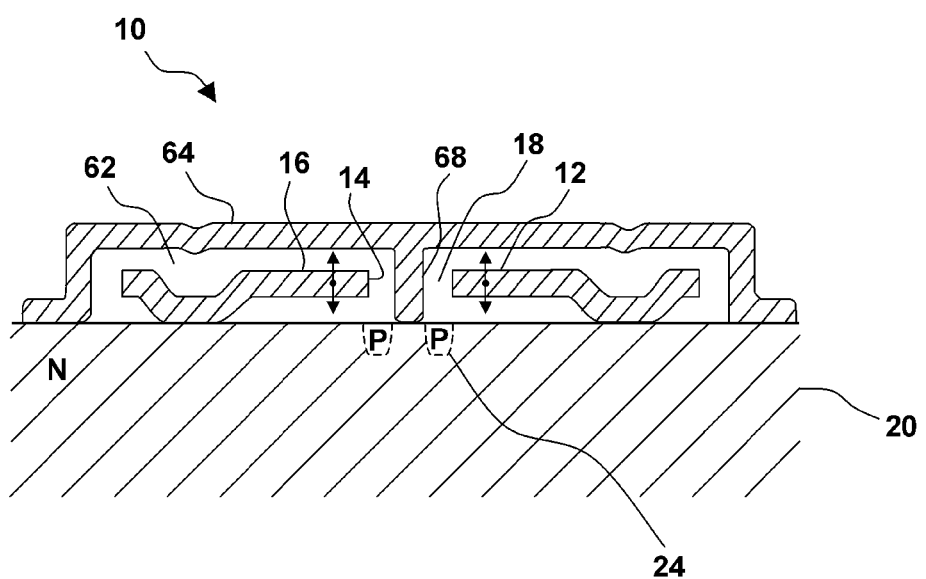
FIG. 10 is a cross-sectional view of an optically coupled resonator having a resonator hole in the resonator body and a shell post extending through the resonator hole to support a resonator shell, in accordance with one embodiment of the current invention.
Figure 11A:
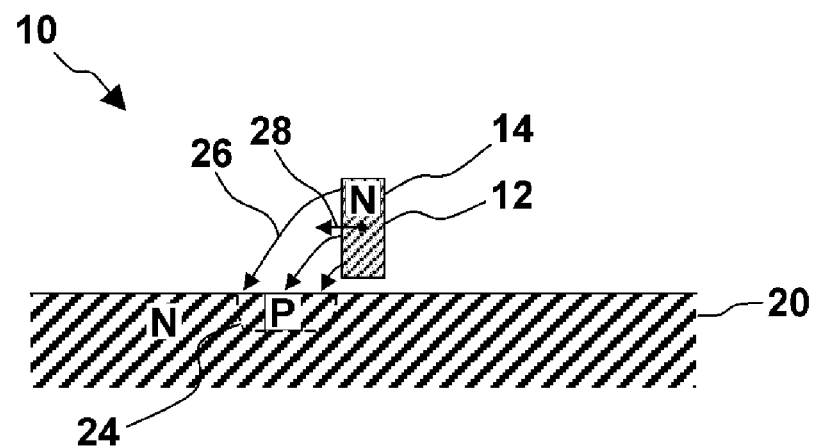
FIG. 11a and FIG. 11b are cross-sectional views of an optically coupled resonator, in accordance with another embodiment of the current invention.
Figure 11B:
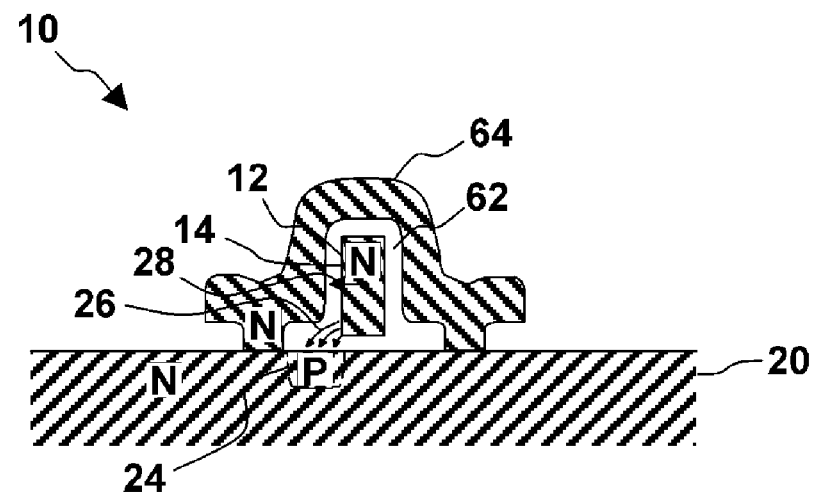

To allow resonator 10 to vibrate freely with minimal viscous damping forces, resonator shell 64 (not shown), described in more detail with respect to FIG. 9, FIG. 10 and FIG. 11*b*, may be positioned around resonator body 12 and laterally offset photodiode 24 to allow vibrations of resonator body 12 within resonator cavity 62 (not shown) between resonator shell 64 and resonator body 12. Resonator shell 64 may be sealed and may contain a vacuum.

In some resonator geometries, resonator body 12 has one or more resonator holes 18 (not shown), as illustrated in FIG. 10. To support resonator shell 64, one or more shell posts 68 (not shown) extend through resonator holes 18 to support resonator shell 64, while allowing resonator body 12 to freely vibrate within resonator cavity 62.

Although incident light 80 and reflected light 82 are shown as perpendicular to semiconductor substrate 20, it will be appreciated that other design variations exist, such as the use of angled incident and angled reflected light, or the use of light impinging from below through a suitably transmissive substrate. Incident light 80 may be comprised of a single wavelength of light or of multiple wavelengths of light, and may cover a narrow or broad range of wavelengths. In one example, incident light 80 of a single wavelength is partially reflected from a surface of resonator body 12. In another example, incident light 80 comprises two wavelengths from two light sources, one of which is used to generate the photovoltage while the other is used to determine vibrations or displacements of resonator body 12. In an alternative configuration, vibrations or displacements of resonator body 12 are detected with a second laterally offset photodiode, and the resulting electrical signal is processed by on-chip or off-chip electronics. In another alternative configuration, laterally offset photodiode 24 is configured in a self-resonant mode wherein lateral or transverse displacements of resonator body 12 diminish the intensity of incident light 80 striking the photodiode, which in turn reduce driving force 28 and allow resonator 10 to return towards an equilibrium position. The driving cycle is then repeated.

Other substrates may be used such as a silicon carbide wafer, a diamond substrates, a silicon-on-sapphire wafer, or an insulative substrates. Other materials such as silicon carbide or diamond may also be used for the resonator. The shell may comprise a transparent or semitransparent material such as silicon nitride, aluminum nitride, silicon carbide, diamond and the like. The substrates may be augmented with additional epitaxial layers and deposited thin films, other mechanical structures such as pressure-sensitive diaphragms, active electronic devices such as transistors, integrated circuits and optoelectronic devices, and optical waveguides. The relative dimensions of resonator 10, resonator shell 64, gaps and substrate 20 may also be varied from those shown in this and the following figures. Although a resonator attached to the substrate at one or both ends is implied by the illustrations, other variations of resonator designs such as those of balanced resonators or multiple resonators or combinations of cantilevered and doubly supported resonators may be equally incorporated. Laterally offset photodiode 24, although shown in close proximity to resonator body 12, may be positioned further away from resonator 10 and be electrically connected to a laterally offset electrode that is proximate to resonator body 12. In another example, photodiode 24 is positioned in resonator shell 64.

Optically coupled resonator 10 with photodiode 24 does not need a vacuum-sealed resonator shell. Resonator 10 can be used as strain-sensitive resonant element in a device such as a strain sensor, a pressure sensor, an accelerometer, an angular rate sensor, a temperature sensor, a magnetic sensor, a chemical sensor, a biological sensor, an explosives detector, a radiation detector, a radio-frequency filter, a voltage-controlled oscillator, a mechanical oscillator, or a resonant device. Semiconductor substrate 20 may be shaped or otherwise sculpted, for example, to incur axial strain on resonator 10 with the application of a stimulus such as applied pressure or acceleration. For example, analysis of the detected resonant frequencies is used to determine an applied stimulus such as mechanical strain that is exerted on resonator body 12 by a suitable microstructure such as a pressure-sensing diaphragm, a flexure of an accelerometer, or a bending of the substrate attached thereto. Devices such as chemical and biological sensors can utilize a specialized coating on portions of the resonator, wherein the specialized coating attracts one or more target chemical or biological species and causes a shift in effective mass or spring constant of the resonator. Other chemical and biological sensors may be configured with one or more specialized coatings on portions of a microstructure having a sealed-cavity strain-sensitive resonator to attract one or more target chemical or biological species and causes a change in applied strain.

Figure 2A:
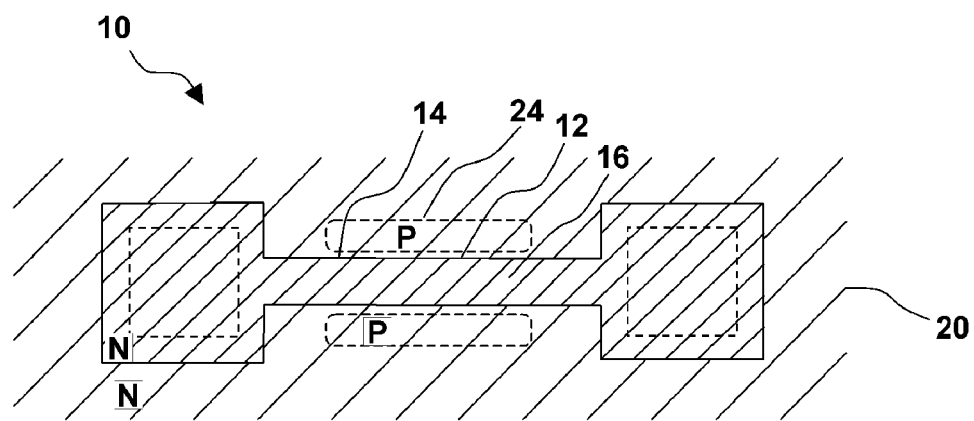
FIG. 2a and FIG. 2b illustrate a plan view and a cross-sectional view of an optically coupled resonator with a rectangular geometry, in accordance with one embodiment of the current invention.
Figure 2B:
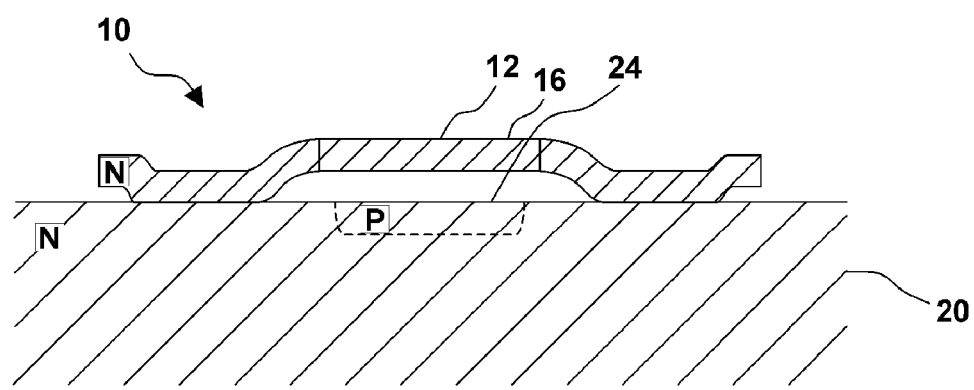

FIG. 2*a* and FIG. 2*b* illustrate a plan view and a cross-sectional view, respectively, of an optically coupled resonator with a rectangular geometry, in accordance with one embodiment of the present invention. Having a rectangular geometry, optically coupled resonator 10 includes resonator body 12 and resonator sidewalls 14. Resonator body 12 is fixedly attached to semiconductor substrate 20 at opposite ends of resonator body 12 such that mechanical strain applied to the opposite ends of resonator body 12 cause a shift in at least one resonant frequency of resonator 10. One or more laterally offset photodiode 24 formed in semiconductor substrate 20 are positioned adjacent to resonator body 12. Incident light striking laterally offset photodiodes 24 generate an electric field that drives resonator 10. Vibrations of resonator 10 may be sensed with reflected light from resonator surface 16 of resonator 10. Resonator shell 64, illustrated in FIG. 9, is optionally positioned around resonator body 12 and laterally offset photodiode 24 to allow resonator body 12 to vibrate within resonator cavity 62 between resonator shell 64 and resonator body 12. For the description of this figure and the figures that follow, similarly numbered objects correspond to similar elements. Resonator shell 64 may be sealed and contain a vacuum to allow vibrations of resonator 10 with minimal viscous damping.

Figure 3A:
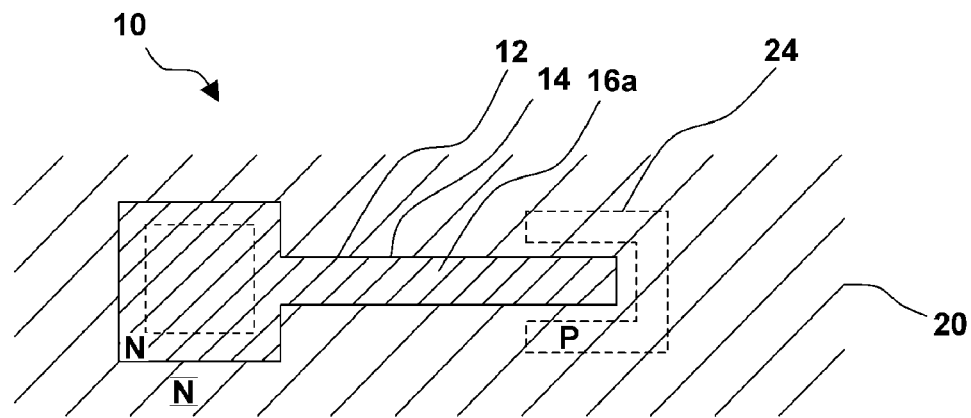
FIG. 3a and FIG. 3b illustrate a plan view and a cross-sectional view of an optically coupled resonator attached at one attachment location, in accordance with one embodiment of the current invention.
Figure 3B:
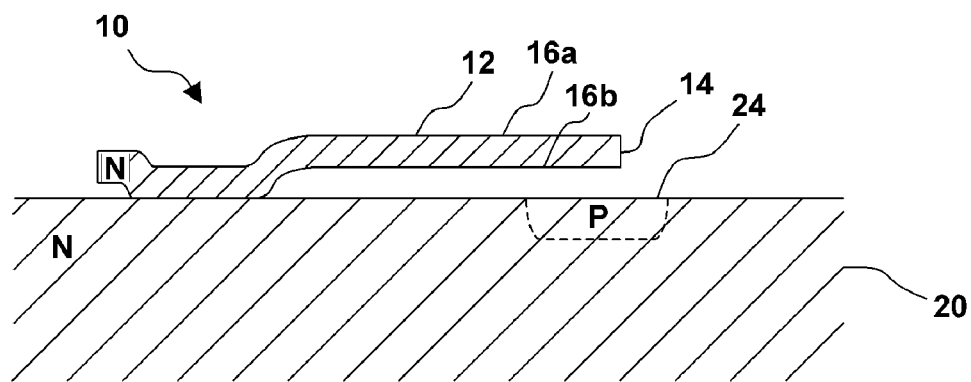

FIG. 3a and FIG. 3b illustrate a plan view and a cross-sectional view, respectively, of an optically coupled resonator attached at one attachment location, in accordance with one embodiment of the present invention. Optically coupled resonator 10 with resonator body 12 and resonator sidewalls 14 is cantilevered, being fixedly attached to semiconductor substrate 20 at one attachment location near an end of resonator body 12. Attached to semiconductor substrate 20 at one location, resonator body 12 allows vibrations of resonator 10 and reduces sensitivity to mechanical strain generated in semiconductor substrate 20. Laterally offset photodiode 24, which is formed in semiconductor substrate 20 adjacent to one or more resonator sidewalls 14 of resonator body 12, drives resonator 10 when incident light strikes photodiode 24. A vibration of resonator 10 may be sensed with reflected light reflected from one or more resonator surfaces 16a and 16b of resonator 10. Resonator shell 64, illustrated in FIG. 9, may be positioned around resonator body 12 and laterally offset photodiode 24 to allow vibrations of resonator body 12 within resonator cavity 62, also shown in FIG. 9, between resonator shell 64 and resonator body 12 with minimal damping when resonator shell 64 is sealed with an internal vacuum.

Figure 4A:
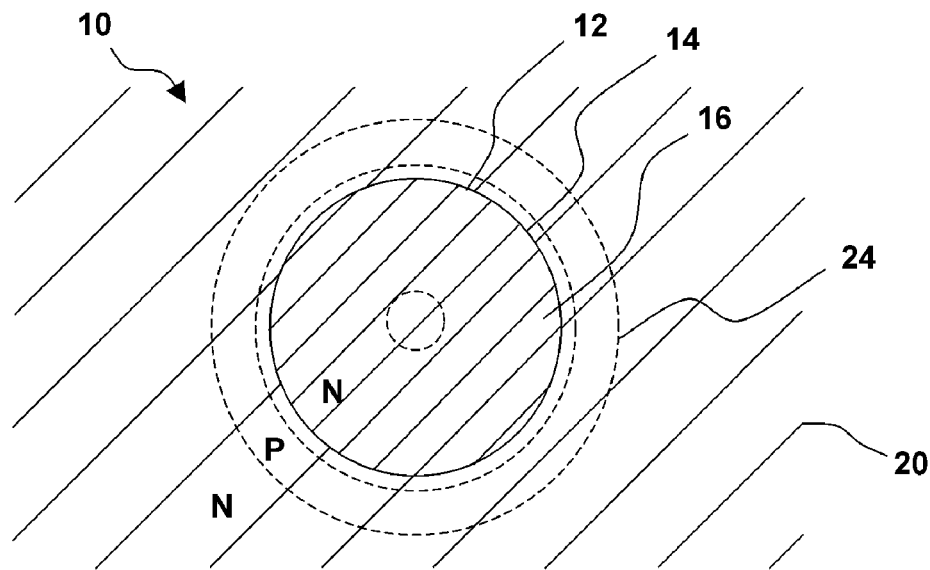
FIG. 4a and FIG. 4b illustrate a plan view and a cross-sectional view of an optically coupled resonator with a circular geometry, in accordance with one embodiment of the current invention.
Figure 4B:
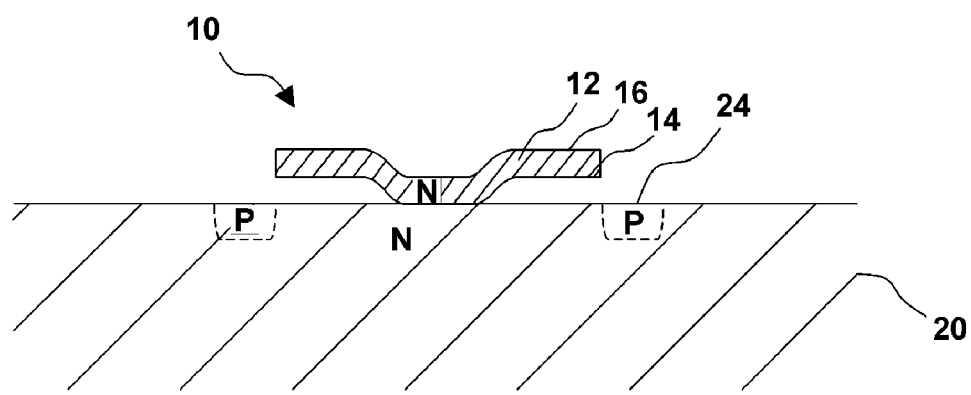

FIG. 4a and FIG. 4b illustrate a plan view and a cross-sectional view, respectively, of an optically coupled resonator with a circular geometry, in accordance with one embodiment of the present invention. Optically coupled resonator 10 with resonator body 12 and resonator sidewall 14 is circularly shaped, fixedly attached to semiconductor substrate 20 at an attachment location near the geometric center of resonator 10. Laterally offset photodiode 24 is formed in semiconductor substrate 20 adjacent to resonator body 12, and may extend concentrically around a portion or the entire circumferential perimeter of resonator 10. Resonator 10 is driven by an electric field generated between laterally offset photodiode 24 and resonator body 12 when incident light strikes photodiode 24. Vibrations of resonator 10 may be sensed with reflected light from one or more resonator surfaces 16 of resonator 10.

Resonator shell 64, described with respect to FIG. 9, may be positioned around resonator body 12 and laterally offset photodiode 24 to allow resonator body 12 to vibrate within resonator cavity 62 between resonator shell 64 and resonator body 12. Resonator shell 64 may be sealed and may contain a vacuum to reduce viscous damping of resonator 10.

Figure 5A:
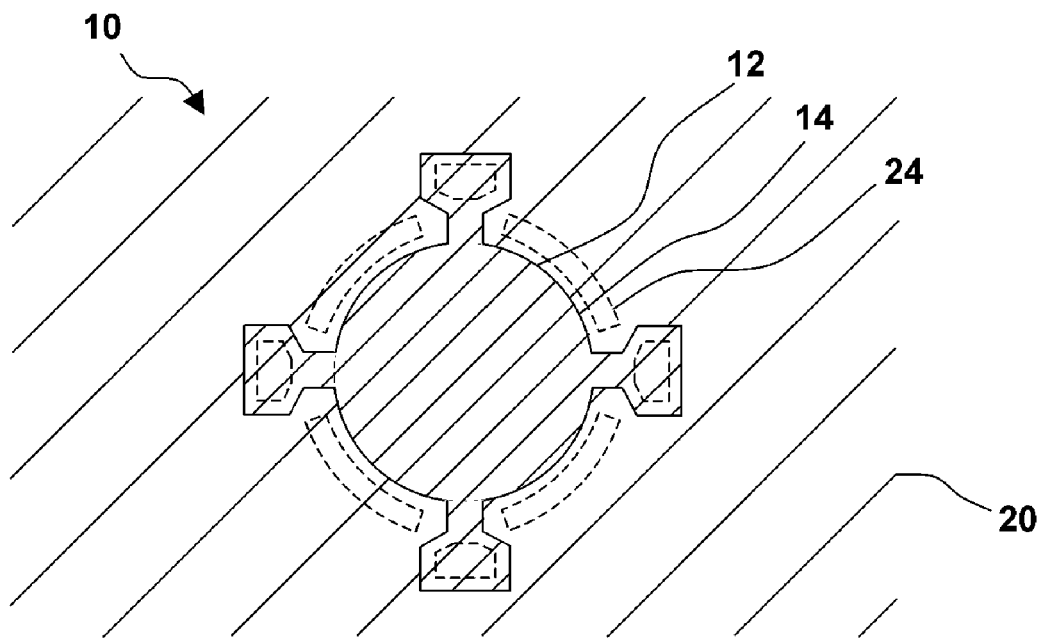
FIG. 5a and FIG. 5b illustrate a plan view and a cross-sectional view of an optically coupled resonator having a circular geometry and attached at opposite ends, in accordance with one embodiment of the current invention.
Figure 5B:
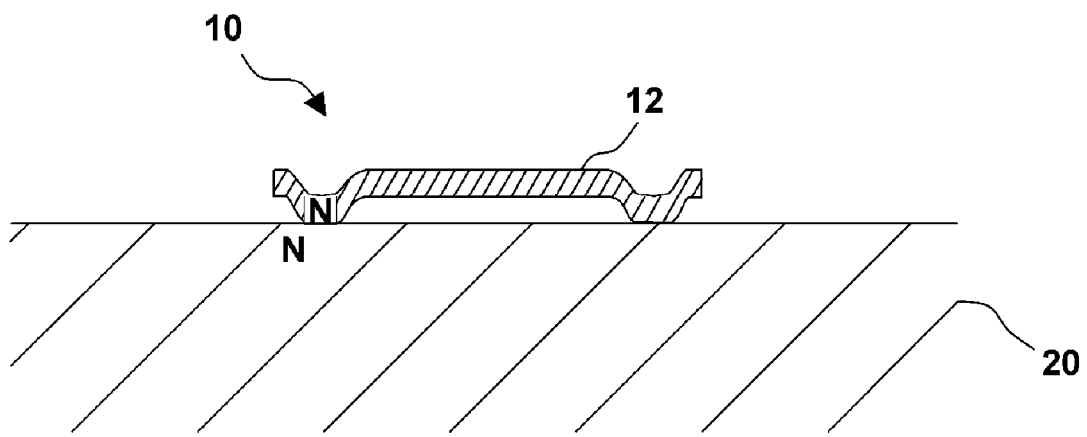

FIG. 5a and FIG. 5b illustrate a plan view and a cross-sectional view, respectively, of an optically coupled resonator having a circular geometry and attached at opposite ends, in accordance with one embodiment of the present invention. Optically coupled resonator 10 with resonator body 12 and resonator sidewall 14 is circularly shaped, fixedly attached to semiconductor substrate 20 at a pair of opposite ends of resonator body 12 such that mechanical strain applied to opposite ends of resonator body 12 cause a shift in one or more resonant frequencies of resonator 10. Optionally, resonator body 12 may be additionally attached to semiconductor substrate 20 at a central attachment location to increase the fundamental resonant frequency of resonator 10.

Laterally offset photodiode 24 formed in semiconductor substrate 20 is adjacent to portions of outer sidewall 14 of resonator body 12. Resonator 10 is driven by an electric field generated between laterally offset photodiode 24 and resonator body 12 when incident light strikes photodiode 24. Vibrations of resonator 10 may be sensed with reflected light from a surface of resonator 10.

Resonator shell 64, described with respect to FIG. 9 and FIG. 10, may be positioned around resonator body 12 and laterally offset photodiode 24 to allow resonator body 12 to vibrate within resonator cavity 62 between resonator shell 64 and resonator body 12. Resonator shell 64 may be sealed and contain a vacuum. As shown later in FIG. 10, one or more shell posts 68 may extend through one or more resonator holes 18 in resonator body 12 to support resonator shell 64 while allowing vibrations of resonator body 12 within resonator cavity 62.

Figure 6A:
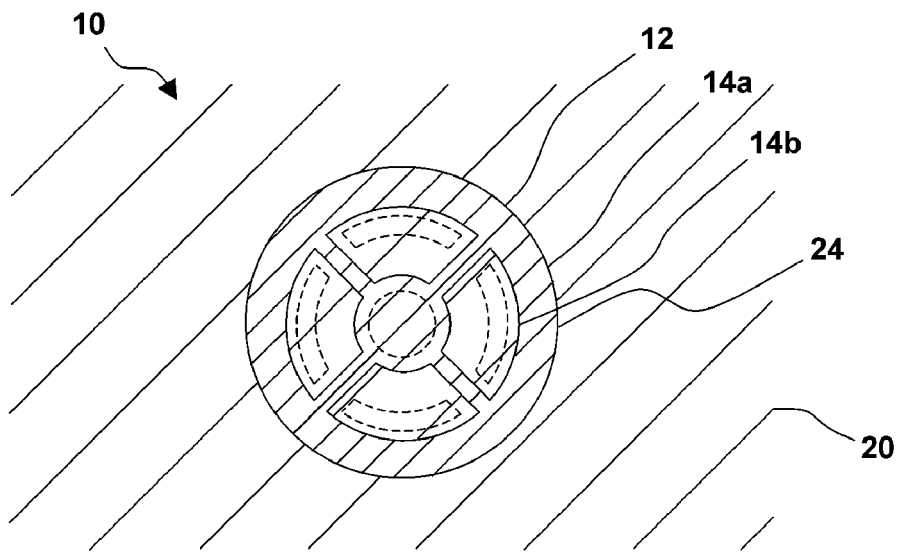
FIG. 6a and FIG. 6b illustrate a plan view and a cross-sectional view of an optically coupled resonator with a ring geometry, in accordance with one embodiment of the current invention.
Figure 6B:
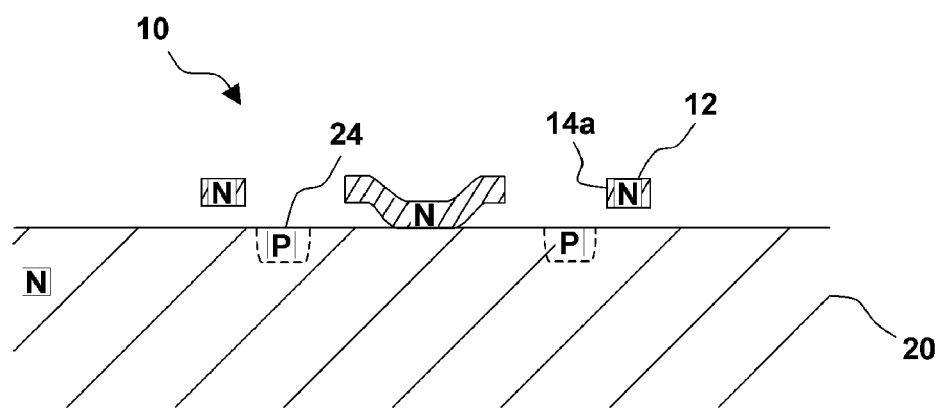

FIG. 6a and FIG. 6b illustrate a plan view and a cross-sectional view, respectively, of an optically coupled resonator with a ring geometry, in accordance with one embodiment of the present invention. Optically coupled resonator 10 with resonator body 12 and resonator sidewalls 14a and 14b has a ring geometry with laterally offset photodiode 24 formed in semiconductor substrate 20 adjacent to either outer sidewall 14a of resonator body 12, inner sidewall 14b of resonator body 12, or a combination thereof. Resonator 10 is driven by an electric field generated between laterally offset photodiode 24 and resonator body 12 when incident light strikes photodiode 24. Vibrations of resonator 10 may be sensed with light reflected off of a surface of resonator 10.

Resonator body 12 may be fixedly attached to semiconductor substrate 20 at a central attachment location as shown. Alternatively, resonator body 12 may be fixedly attached to semiconductor substrate 20 at opposite ends of resonator body 12 such that mechanical strain applied to the opposite ends of resonator body 12 cause a shift in at least one resonant frequency of resonator 10.

Resonator shell 64, illustrated in FIG. 9, may be positioned around resonator body 12 and laterally offset photodiode 24 to allow resonator body 12 to vibrate within resonator cavity 62 between resonator shell 64 and resonator body 12. Resonator shell 64 may be sealed with a vacuum to minimize viscous damping during oscillations of resonator 10.

Figure 7A:
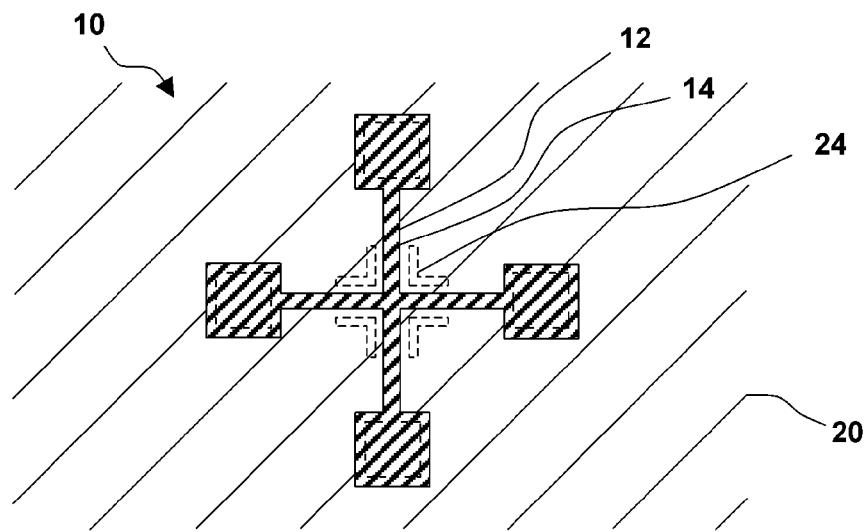
FIG. 7a and FIG. 7b illustrate a plan view and a cross-sectional view of an optically coupled resonator with an x-shaped resonator body, in accordance with one embodiment of the current invention.
Figure 7B:
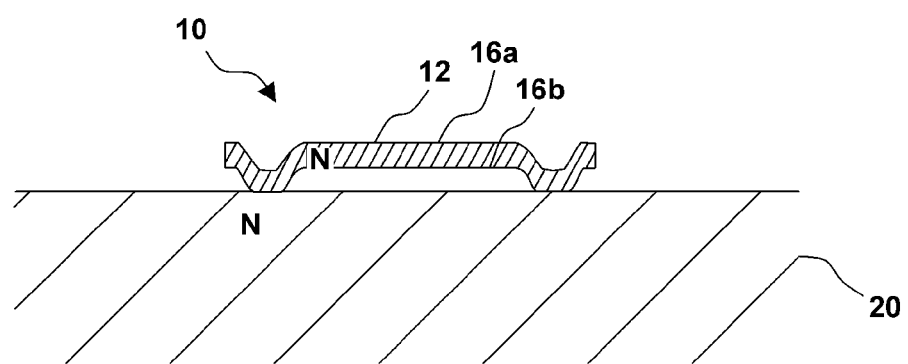

FIG. 7a and FIG. 7b illustrate a plan view and a cross-sectional view, respectively, of an optically coupled resonator with an x-shaped resonator body, in accordance with one embodiment of the present invention. Optically coupled resonator 10 with resonator body 12 and resonator sidewalls 14 has an x-shaped geometry. Resonator body 12 is fixedly attached to semiconductor substrate 20 at opposite ends of resonator body 12 such that mechanical strain applied to the opposite ends of resonator body 12 cause a shift in one or more resonant frequencies of resonator 10. Although shown with segments of resonant body 12 having identical lengths, the segments may have different lengths that result in separated resonant modes. In a pressure sensor, for example, resonator 10 with x-shaped resonator body 12 may be used to allow cancellation of temperature effects while determining applied pressure. Alternatively, two opposite ends of resonator body 12 may be free from the substrate and allowed to vibrate in a flexural mode, a torsional mode, or a combination thereof.

Laterally offset photodiode 24 is formed in semiconductor substrate 20 adjacent to one or more resonator sidewalls 14 of resonator body 12. Resonator 10 is driven by an electric field generated between laterally offset photodiode 24 and resonator body 12 or a sidewall thereof when incident light strikes photodiode 24. Vibrations of resonator 10 may be sensed with light reflected off of one or more resonator surfaces 16a and 16b of resonator 10.

In the case of resonator 10 with x-shaped resonator body 12 and other resonator geometries, photodiode 24 may be positioned in semiconductor substrate 20 underneath resonator body 12. Centered or offset holes may be selectively placed in resonator 10.

Resonator shell 64, illustrated in FIG. 9, may be positioned around resonator body 12 and laterally offset photodiode 24 to allow resonator body 12 to vibrate within resonator cavity 62 between resonator shell 64 and resonator body 12. Resonator shell 64 may be sealed and may contain a vacuum to minimize viscous damping of resonator 10.

Figure 8:
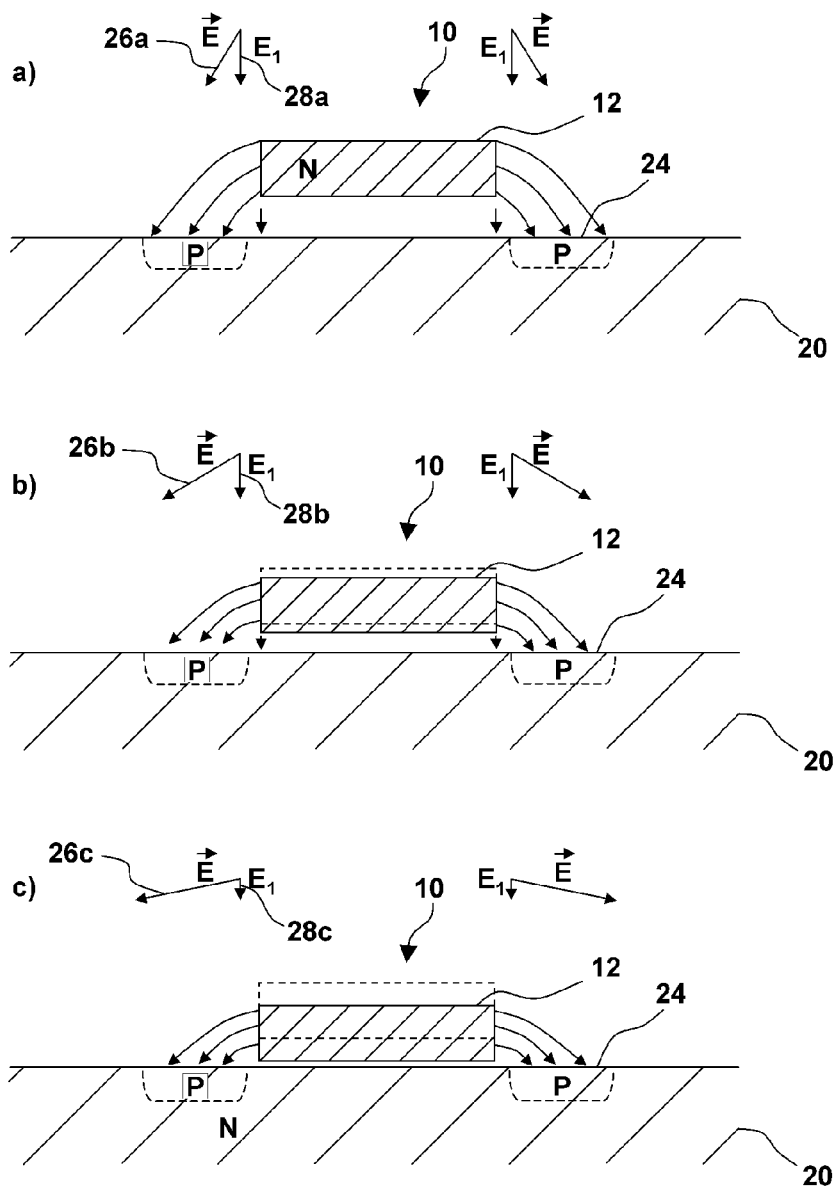
FIG. 8 illustrates a method of operating an optically coupled resonator, in accordance with one embodiment of the current invention.

FIG. 8 illustrates a method of operating an optically coupled resonator, in accordance with one embodiment of the present invention. Optically coupled resonator 10 is driven when laterally offset photodiode 24 is struck with incident light. Electric fields 26a, 26b and 26c are generated between laterally offset photodiode 24 and a portion of resonator 10, such as a lower surface, a sidewall, or an upper surface, in response to the incident light. Resonator 10 is driven with driving components 28a, 28b and 28c of electric fields 26a, 26b and 26c, respectively. Based in part on the lateral space between laterally offset photodiode 24 and resonator body 12, driving components 28a, 28b and 28c of electric fields 26a, 26b and 26c, respectively, diminishes when resonator 10 is displaced. FIG. 8a illustrates an undeflected resonator 10 in a resting or equilibrium position. Incident light is applied and driving component 28a of electric field 26a provides a force to pull resonator 10 toward semiconductor substrate 20. As resonator 10 is displaced towards semiconductor substrate 20, electric field 26b increases while driving component 28b decreases, as illustrated in FIG. 8b. With further displacements of resonator 10 towards semiconductor substrate 20, electric field 26c further increases while driving component 28c further decreases, as illustrated in FIG. 8c.

Mechanical restoring forces pull resonator 10 back towards the equilibrium position when the incident light is removed. Timed injections of incident light may be used to stimulate and excite resonator 10 into one or more resonant modes, whose resonant frequencies can be determined, for example, with reflected light from one or more surfaces of resonator 10. Mechanical strain may be applied to opposite ends of resonator 10 to shift one or more resonant frequencies of resonator 10. The shift in resonant frequency is measured to determine the applied mechanical strain.

FIG. 9 is a cross-sectional view of an optically coupled resonator with a resonator shell, in accordance with one embodiment of the present invention. Sealed-cavity resonator 10 with resonator body 12 and laterally offset photodiode 24 formed in semiconductor substrate 20 adjacent to resonator body 12 is covered by resonator shell 64. Laterally offset photodiode 24 is adjacent to one or more inner or outer sidewalls 14 of resonator body 12. Resonator body 12 may have various geometries, such as a rectangular geometry, a circular geometry, a ring geometry, or an x-shaped geometry. Resonator body 12 may be fixedly attached to semiconductor substrate 20 at one or more attachment locations. Resonator shell 64 is positioned around resonator body 12 and laterally offset photodiode 24 to allow resonator body 12 to vibrate within resonator cavity 62 between resonator shell 64 and resonator body 12. Resonator shell 64 may be sealed. A vacuum may be sealed within resonator cavity 62 to reduce viscous damping of vibrations of resonator 10 within resonator shell 64.

Incident light 80 striking laterally offset photodiode 24 drives resonator 10. Vibrations of resonator 10 may be sensed with reflected light 82 from resonator surface 16 of resonator 10. Incident light 80 and reflected light 82 penetrates through partially transmitting resonator shell 64 to excite and detect vibrations of resonator 10.

Vibrations or displacements of resonator 10 may be sensed, for example, with reflected light 82 that is reflected from at least one surface of resonator 10 such as upper resonator surface 16. Incident light 80 partially transmits through resonator shell 64 to allow reflections of incident light 80 from upper surface 16 of resonator body 12. Reflected light 82 is intensity modulated in correspondence with vibrations or displacements of resonator body 12 within resonator shell 64. Portions of incident light 80 may reflect one or more times in the gap between resonator shell 64 and resonator body 12 before being transmitted back through resonator shell 64 or continuing towards semiconductor substrate 20. Similarly, portions of incident light 80 may reflect one or more times in the gap between resonator body 12 and semiconductor substrate 20 before being transmitted back through resonator body 12 and resonator shell 64 or into semiconductor substrate 20. Similarly, portions of incident light 80 may reflect one or more times between surfaces of resonator shell 64, or between surfaces of resonator body 12. Each reflection of incident light 80 may constructively or destructively interfere with other reflection portions of incident light 80 to enhance or diminish the intensity of reflected light 82. The absorption of incident light 80 in resonator shell 64, resonator body 12 or semiconductor substrate 20 reduces the intensity of reflected light 82, and the wavelengths of incident light 80 are chosen to allow suitable transmission of incident light 80 and reflected light 82.

FIG. 10 is a cross-sectional view of an optically coupled resonator having a resonator hole in the resonator body and a shell post extending through the resonator hole to support a resonator shell, in accordance with one embodiment of the present invention. Sealed-cavity resonator 10 with resonator body 12 and one or more resonator sidewalls 14 along with laterally offset photodiode 24 adjacent to resonator body 12 are covered by resonator shell 64 positioned around resonator body 12 and laterally offset photodiode 24 to allow resonator body 12 to vibrate within resonator cavity 62 between resonator shell 64 and resonator body 12. Resonator 10 may be attached to semiconductor substrate 20 at one or more attachment locations. Resonator shell 64 may be sealed and may contain a vacuum within resonator cavity 62. Shell post 68 extends through resonator hole 18 in resonator body 12 to support resonator shell 64 while allowing vibrations of resonator body 12 within resonator cavity 62. Resonator geometries such as circles, plates or rings that require larger spans of resonator shell 64 may use the hole and post approach to support resonator shell 64, particularly when atmospheric or higher pressure levels are applied to an outer surface of resonator shell 64 while a vacuum is maintained within.

Vibrations of resonator 10 may be excited with incident light striking laterally offset photodiode 24 and sensed with reflected light from resonator surface 16 of resonator 10. Incident light and reflected light penetrates through partially transmitting resonator shell 64 to excite and detect vibrations of resonator 10.

FIG. 11a and FIG. 11b are cross-sectional views of an optically coupled resonator, in accordance with another embodiment of the present invention. Optically coupled resonator 10 with resonator body 12 and one or more resonator sidewalls 14 and laterally offset photodiode 24 are formed in semiconductor substrate 20 adjacent to resonator body 12, as illustrated in FIG. 11a. Resonator 10 is driven by electric field 26 generated between laterally offset photodiode 24 and resonator body 12 when incident light strikes photodiode 24. Resonator 10 is fixedly attached to semiconductor substrate 20 at one or more attachment locations and vibrates in a direction parallel to a surface of semiconductor substrate 20.

Generated electric field 26 between laterally offset photodiode 24 and resonator body 12 has driving component 28 to drive resonator 10. In one example, driving component 28 diminishes when resonator body 12 is displaced. Driving component 28 of generated electric field 26 between laterally offset photodiode 24 and resonator body 12 diminishes when resonator body 12 is displaced. In another example, laterally offset photodiode 24 generates driving component 28 of electric field 26 substantially in phase with a vibrating velocity of resonator body 12. Vibrations of resonator 10 may be sensed with light reflected off a surface of resonator 10.

Resonator shell 64 may be positioned around resonator body 12 and laterally offset photodiode 24 to allow resonator body 12 to vibrate within resonator cavity 62 between resonator shell 64 and resonator body 12, as illustrated in FIG. 11b. Resonator shell 64 may be sealed and may contain a vacuum within resonator cavity 62.

Laterally offset photodiode 24 and resonator body 12 may be configured in a self-resonant mode wherein lateral displacements of resonator body 12 diminish the intensity of incident light striking photodiode 24, which in turn reduce driving force 28 and allow resonator 10 to return towards an equilibrium position. The driving cycle is then repeated. For example, incident light traveling through a tailored gap between sidewall 14 and a portion of resonator shell 64 or other suitable feature diminishes as the effective gap is reduced with lateral displacements of resonator body 12, resulting in less light striking photodiode 24 and therefore allowing resonator body 12 to self-oscillate with or without modulated incident light.

Figure 12A:
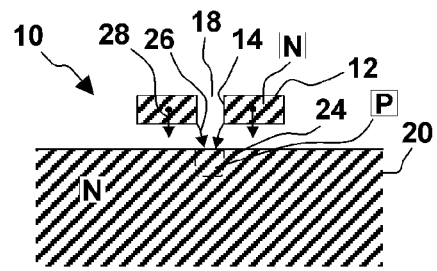
FIG. 12a, FIG. 12b, FIG. 12c, FIG. 12d, FIG. 12e and FIG. 12f are cross-sectional views of optically coupled resonators with photodiodes in various representative locations, in accordance with other embodiments of the current invention.
Figure 12B:
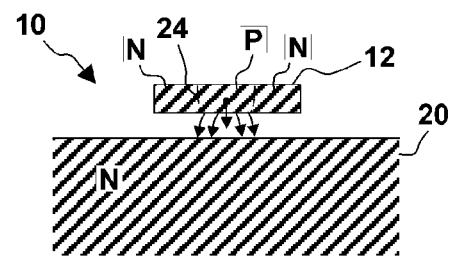
Figure 12C:
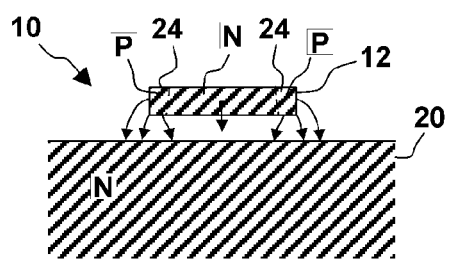
Figure 12D:
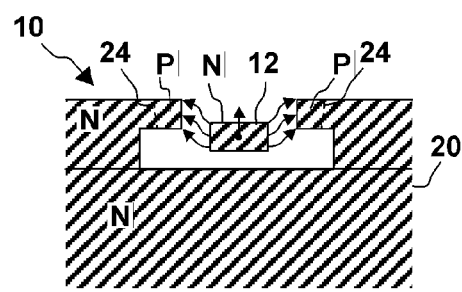
Figure 12E:
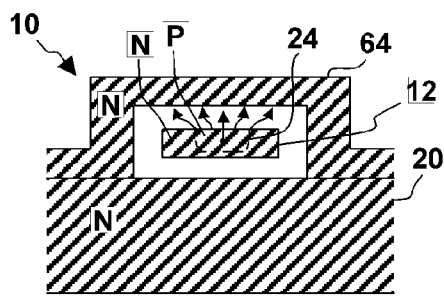
Figure 12F:
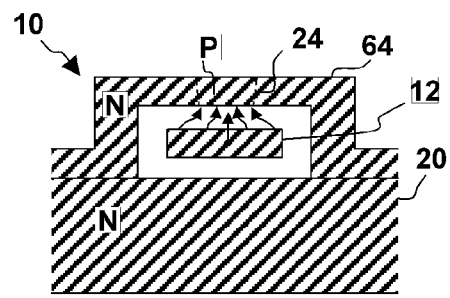

FIG. 12a, FIG. 12b, FIG. 12c, FIG. 12d, FIG. 12e, and FIG. 12f, are cross-sectional views of optically coupled resonators with photodiodes in various representative locations, in accordance with other embodiments of the present invention. Resonator 10 attached to substrate 20 at one or more locations (not shown) has one or more centered or offset holes 18 through resonator body 12 with sidewalls 14, under which a laterally offset photodiode 24 is located, as illustrated in FIG. 12a. Incident light generates electric field 26 and driving component 28 in the direction of travel of resonator 10. Resonator 10 with a photodiode 24 formed in resonator body 12 generates an attractive force towards substrate 20 when light strikes the diode, as shown in FIG. 12b. One or more photodiodes 24 may be positioned at or near an outer sidewall of resonator body 12 to generate attractive forces to substrate 20 or other structures in close proximity, as shown in FIG. 12c. Photodiode 24 may be positioned near a sidewall of resonator body 12 such as in an adjacent portion of the structural layer or in a sidewall of substrate 20, as shown in FIG. 12d. Although shown penetrating the entire thickness of resonator body 12 in FIG. 12c or of an adjacent sidewall in FIG. 12d, it is recognized that the junction depth of photodiode 24 needs only to partially extend through these elements to obtain a suitable driving force for resonator body 12. Resonator 10 with photodiode 24 located on an upper surface of resonator body 12 generates an attractive force towards resonator shell 64 when light that penetrates resonator shell 64 strikes photodiode 24, as seen in FIG. 12e. Photodiode 24 positioned in resonator shell 64 attracts resonator body 12 thereto when struck with incident light, as shown in FIG. 12f. In general, n-type regions in the shell or substrate are electrically connected to n-type regions in the resonator, so that p-type regions in the shell, beam, sidewalls or substrate generate an attractive force between a fixed and a movable portion of the optically coupled resonator. In these figures and elsewhere, doping types n and p may be reversed without loss of generality.

Figure 13A:
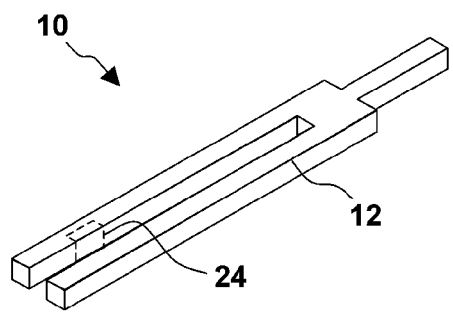
FIG. 13a, FIG. 13b, FIG. 13c and FIG. 13d are isometric views of single-ended and double-ended optically coupled resonators, in accordance with other embodiments of the current invention.
Figure 13B:
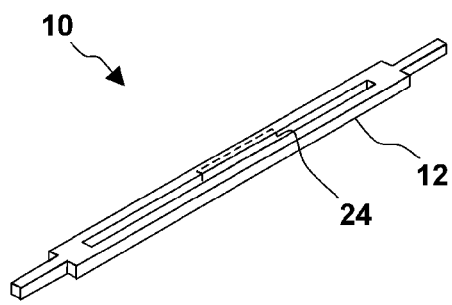
Figure 13C:
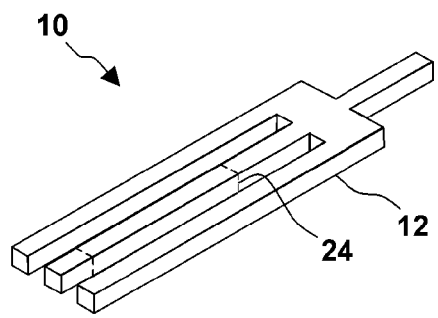
Figure 13D:
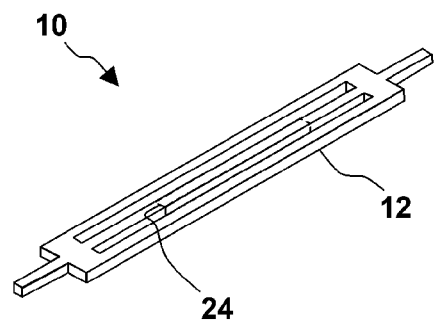

FIG. 13a, FIG. 13b, FIG. 13c, and FIG. 13d, are isometric views of single-ended and double-ended optically coupled resonators, in accordance with other embodiments of the present invention. A single-ended tuning fork resonator 10, shown in FIG. 13a, has two tines of approximately the same length, with at least a portion of resonator body 12 containing a photodiode 24 such as near the tip of one of the tines. A double-ended tuning fork resonator 10 is shown in FIG. 13b with photodiode 24 formed near the center of one tine of resonator body 12. A single-ended trident resonator 10, shown in FIG. 13c, has three tines comprising resonator body 12, with a portion or the entire center tine encompassing photodiode 24. A double-ended trident resonator 10 is shown in FIG. 13d, with the center of the center tine housing photodiode 24. The placement of photodiode 24 in these illustrations and others is intended to be illustrative. Generally, one side or the other of photodiode 24 may lie in the substrate, under the resonator body, laterally offset from the resonator body, in the inner or outer sidewalls of the resonator body, in a sidewall of a relatively immobile structure proximal to a movable portion of the resonator body, on an upper or lower surface of the resonator body, or in a portion of a resonator shell overlying the resonator body.

Figure 14A:
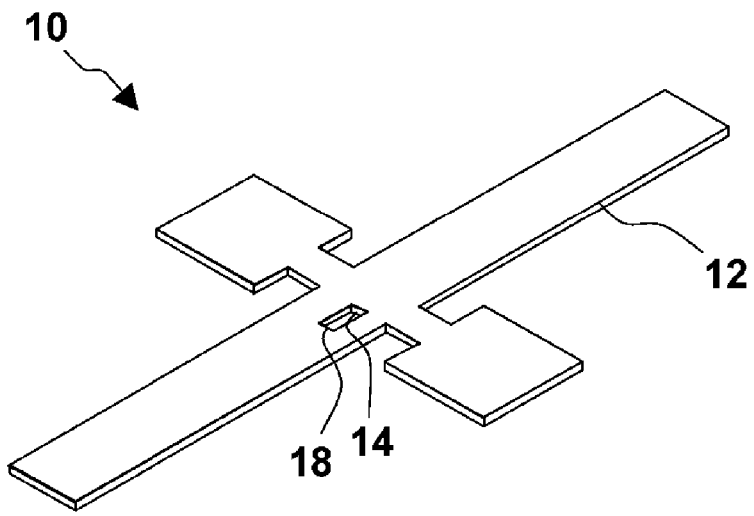
FIG. 14a and FIG. 14b are isometric views of representative optically coupled resonators, in accordance with other embodiments of the current invention.
Figure 14B:
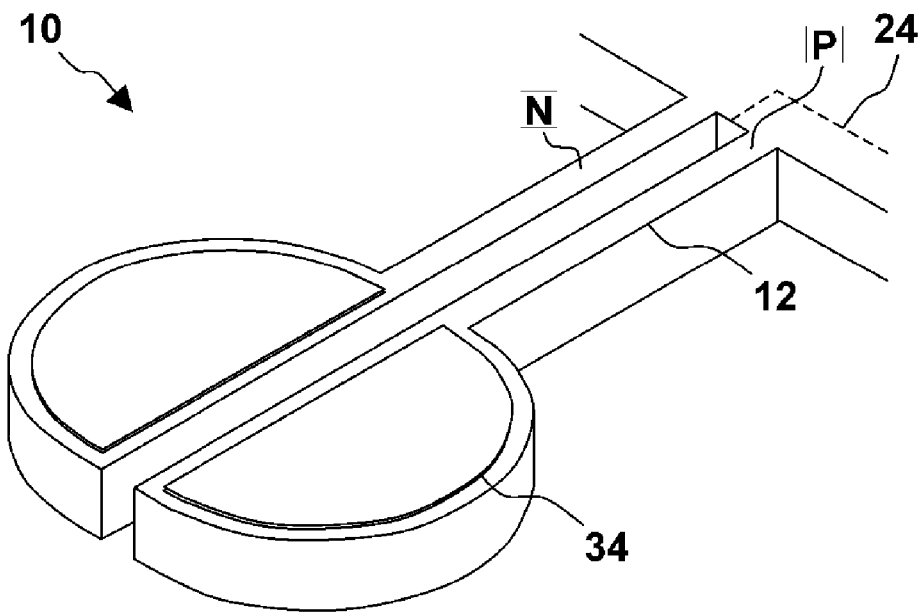

FIG. 14a and FIG. 14b are isometric views of selected optically coupled resonators, in accordance with other embodiments of the present invention. FIG. 14a shows a butterfly resonator 10 that can operate in a variety of flexural and torsional modes. The wings attached to resonator body 12 accentuate a torsional mode that can provide a measure of the device temperature, while a flexural mode is predominantly affected by in-plane axial strain. Hole 18 with sidewalls 14 in resonator body 12 with an underlying photodiode (not shown for clarity) may be offset from the resonator axes to enhance excitation of overtones such as torsional modes and higher-order flexural modes. Resonator configurations such as this one enhance the ability to use small core optical fiber (e.g. less than 6 micrometers) to excite resonator vibrations and detect resonator movements, since the photodiode and movable surfaces are close to the center of the resonator.

FIG. 14b shows a tandem resonator 10 with enlarged ends and a selective coating 34 covering at least a portion of the enlarged ends. By controlling the dimensions and thickness of resonator body 12 and the position of the photodiode, this resonator type can vibrate preferentially in a lateral mode, a flexural mode, or a torsional mode with the two enlarged ends vibrating in or out of phase with each other. In the illustration, one side of the resonator is doped p-type while the other is n-type so that application of incident light will generate an attractive force between the tines. Open-air resonators without a lid or shell such as this one may have specialized coatings for attracting specific target chemical and biological species that can be detected via changes in resonator frequencies and properties. Certain advantages arise with the lateral vibrations in that fluid damping between the resonator body and substrate that normally occurs with flexural modes is reduced. Photodiode 24 may be located in other suitable locations such as the underlying substrate (not shown) or near the outer end of one tine or the other. The tandem resonator geometry, like the others, may be excited with electrical coupling to on-chip or off-chip electronics without the need for optical coupling.

Figure 15:
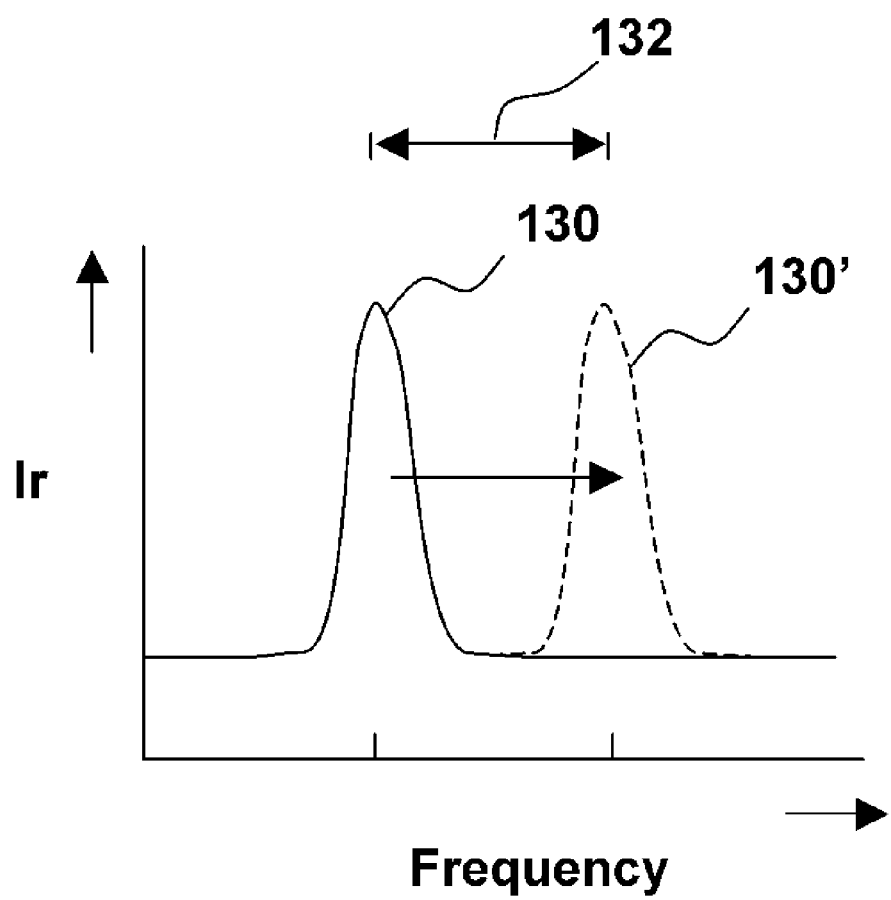
FIG. 15 is a graph illustrating a shift in a resonant frequency of a resonator, in accordance with one embodiment of the current invention.

FIG. 15 is a graph illustrating a shift in a resonant frequency of a resonator, in accordance with one embodiment of the present invention. The laterally offset photodiode is struck with incident light to excite optically coupled resonator. In the example shown, mechanical strain, which is applied to opposite ends of the resonator, shifts one or more resonant frequencies 130 the distance of delta frequency shift 132 to shifted frequency 130'. Shifted resonant frequency 130' may be measured to determine the applied mechanical strain. In another example, a shift in temperature causes a frequency shift 132 in one or more resonant frequencies 130 of the resonator, which results in shifted resonant frequency 130' that may be measured to determine the temperature. In another example, multiple resonators are driven and sensed to determine multiple variables and to allow compensation for effects such as variations of a primary variable with changes in temperature.

Figure 16:
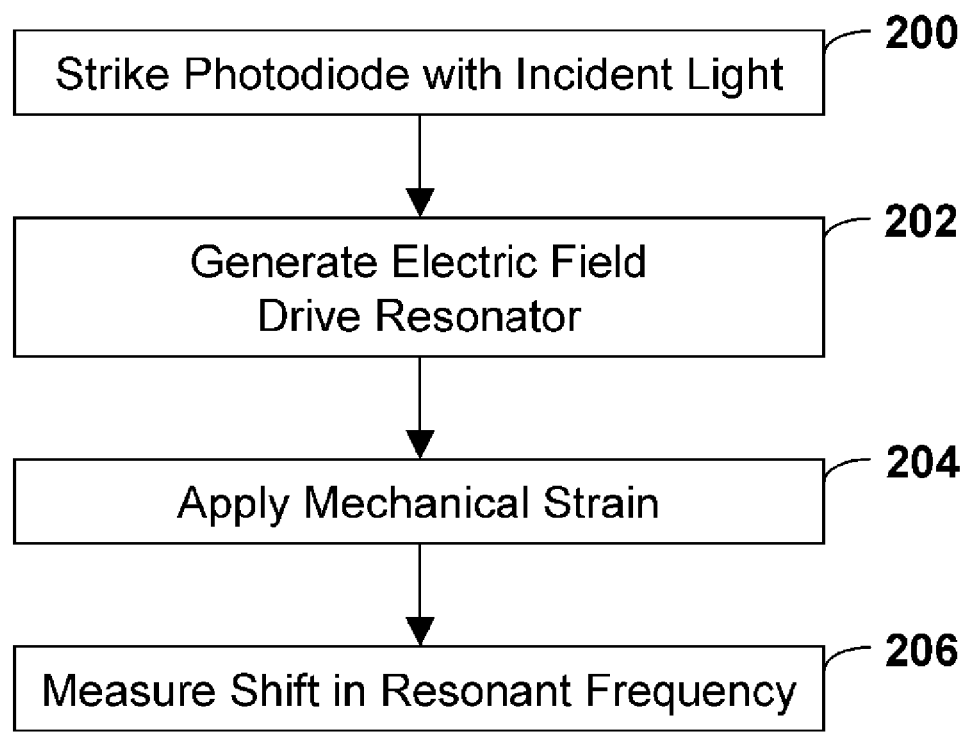
FIG. 16 is a flow diagram of a method for operating an optically coupled resonator, in accordance with one embodiment of the current invention.

FIG. 16 is a flow diagram of a method for operating an optically coupled resonator, in accordance with one embodiment of the present invention.

A laterally offset photodiode is struck with incident light, as seen at block 200. The laterally offset photodiode is struck with incident light from a light source such as a laser, a light-emitting diode, a filtered light source, or other suitable light source. The light source may be modulated or otherwise varied in intensity to excite the resonator into resonance.

An electric field is generated and the resonator is driven, as seen at block 202. The electric field is generated between the laterally offset photodiode and the resonator in response to the incident light. The resonator is driven with a driving component of the electric field that varies with the intensity of the incident light and the displacement of the resonator. In one example, the driving component diminishes when the resonator is displaced.

Mechanical strain is applied, as seen at block 204. Mechanical strain may be applied to opposite ends of the resonator to shift one or more resonant frequencies of the resonator using, for example, a pressure sensor diaphragm or an accelerometer flexure.

A shift in a resonator frequency of the resonator is measured, as seen at block 206. The shift in resonant frequency is measured using, for example, reflected light from a surface of the resonator striking a photodiode or other photodetector to determine the applied mechanical strain. In another example, vibrations of the resonator body are sensed by a photovoltage generated by the laterally offset photodiode when the resonator vibrations modulate incident light striking the photodiode. Using analytical techniques such as mathematical modeling or other signal processing techniques such as a look-up table, the applied pressure, acceleration, temperature, rotation, or other applied stimulus may be determined.

Other resonator designs and configurations include resonators attached to the substrate at one or both ends, cantilevered resonators, doubly supported resonators, cross resonators, butterfly resonators, crisscross resonators, single-ended and double-ended tuning fork resonators, single-ended and double-ended trident resonators, lobed resonators, circular resonators, oval resonators, ring resonators, beam resonators, balanced resonators, thin-beam resonators, cantilevered resonators with enlarged ends, tandem resonators, tandem resonators with enlarged ends, high-Q resonators, disk resonators, comb resonators, flexural resonators, torsional resonators, combination flexural/torsional resonators, lateral resonators, substrate resonators, bulk-mode resonators, surface-mode resonators, higher-mode resonators, resonators with one or more centered or offset holes, open-air resonators without a lid or shell, multiple resonators, resonator arrays, or combinations thereof. These resonators may be configured with or without a resonator shell. The resonator body may be exposed to atmospheric conditions, or placed in a suitable package that may be evacuated or filled with a controlled gas. Open-air resonators without a lid or shell may have specialized coatings for attracting specific target chemical and biological species that can be detected via changes in resonator frequencies and properties.

The photodiode, although generally within or in close proximity to the resonator body, may be positioned further away from the resonator and be electrically connected to a suitable driving electrode that is proximate to the movable resonator body.

In other embodiments, a thermally absorptive feature or material is selectively formed or placed on or near the resonator body to allow photothermal excitation of the resonator. Alternatively, the resonators, devices and processes can be adapted to form electrically coupled resonant devices, foregoing the need for optical connectivity. On-chip integrated circuitry or bondwire connections to external circuitry can be provided for generating and processing the output from the resonator.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are embraced herein.

What is claimed is:

1. An optically coupled resonator, comprising:
   a resonator body having at least one resonator sidewall; and
   a laterally offset photodiode formed in a semiconductor substrate adjacent to the resonator body, wherein the resonator is driven by an electric field generated between the laterally offset photodiode and the resonator body when an incident light strikes the photodiode.

2. The resonator of claim 1, wherein the resonator body is fixedly attached to the semiconductor substrate at at least one attachment location.

3. The resonator of claim 1, wherein the resonator body is fixedly attached to the semiconductor substrate at opposite ends of the resonator body such that mechanical strain applied to the opposite ends of the resonator body cause a shift in at least one resonant frequency of the resonator.

4. The resonator of claim 1, wherein the generated electric field between the laterally offset photodiode and the resonator body has a driving component that diminishes when the resonator body is displaced towards the semiconductor substrate.

5. The resonator of claim 1, wherein the laterally offset photodiode generates a driving component of the electric field substantially in phase with a vibrating velocity of the resonator body.

6. The resonator of claim 1, wherein the generated electric field between the laterally offset photodiode and the resonator body diminishes when the resonator body is displaced to prevent electrostatic pull-in.

7. The resonator of claim 1, wherein a vibration of the resonator is sensed with a reflected light, the reflected light reflected off of a surface of the resonator.

8. The resonator of claim 1, wherein the optically coupled resonator is self-resonant.

9. The resonator of claim 1 further comprising:
   a resonator shell around the resonator body to allow the resonator body to vibrate within a resonator cavity between the resonator shell and the resonator body.

10. The resonator of claim 9, wherein the resonator shell is sealed.

11. The resonator of claim 9, wherein the resonator cavity contains a vacuum.

12. The resonator of claim 9 further comprising:
a resonator hole through the resonator body; and
a shell post through the resonator hole, wherein the shell post supports the resonator shell while allowing vibrations of the resonator body within the resonator cavity.

13. The resonator of claim 1, wherein the resonator body has a rectangular geometry.

14. The resonator of claim 1, wherein the resonator body has one of a circular geometry or a ring geometry.

15. The resonator of claim 1, wherein the resonator body is x-shaped.

16. The resonator of claim 1, wherein the laterally offset photodiode is adjacent to an inner sidewall or an outer sidewall of the resonator body.

17. A device including an optically coupled resonator, the device comprising:
a laterally offset photodiode adjacent to the resonator, wherein the resonator is driven by a driving component of an electric field generated between the laterally offset photodiode and the resonator when an incident light strikes the photodiode.

18. The device of claim 17, wherein the device is selected from the group consisting of a strain sensor, a pressure sensor, an accelerometer, an angular rate sensor, a temperature sensor, a chemical sensor, a biological sensor, an explosives detector, a radiation detector, a radio-frequency filter, a voltage-controlled oscillator, a mechanical oscillator, and a resonant device.

19. A method of operating an optically coupled resonator, the method comprising:
striking a laterally offset photodiode with an incident light;
generating an electric field between the laterally offset photodiode and the resonator in response to the incident light; and
driving the resonator with a driving component of the electric field that diminishes when the resonator is displaced.

20. The method of claim 19 further comprising:
applying mechanical strain to opposite ends of the resonator to shift at least one resonant frequency of the resonator; and
measuring the shift in resonant frequency to determine the applied mechanical strain.

* * * * *